US008393051B2

(12) United States Patent
Gomez et al.

(10) Patent No.: US 8,393,051 B2
(45) Date of Patent: Mar. 12, 2013

(54) METHOD AND DEVICE FOR CLEANING THE WATER TRICKLING SURFACES IN AN AIR/WATER HEAT EXCHANGER

(75) Inventors: Rémi Gomez, Paris (FR); Nicolas Laurent, Poix (FR); Michel Degrange, Paris (FR); Jean-Marc Meurville, Nailly (FR); Paule Blokbergen, Clermont-Ferrand (FR)

(73) Assignee: Dyanergie, Paris (FR)

( * ) Notice: Subject to any disclaimer, the term of this patent is extended or adjusted under 35 U.S.C. 154(b) by 576 days.

(21) Appl. No.: 12/307,222

(22) PCT Filed: Jul. 2, 2007

(86) PCT No.: PCT/FR2007/001114

§ 371 (c)(1), (2), (4) Date: Dec. 31, 2008

(87) PCT Pub. No.: WO2008/003851

PCT Pub. Date: Jan. 10, 2008

(65) Prior Publication Data

US 2009/0229792 A1 Sep. 17, 2009

(30) Foreign Application Priority Data

Jul. 3, 2006 (FR) ..................................... 06 05983

(51) Int. Cl.
*B08B 9/02* (2006.01)

(52) U.S. Cl. ........................................... 15/406; 15/404

(58) Field of Classification Search .................... 15/404, 15/405, 406, 316.1
See application file for complete search history.

(56) References Cited

U.S. PATENT DOCUMENTS

| | | | |
|---|---|---|---|
| 4,089,702 | A | 5/1978 | Enoksson et al. |
| 4,461,651 | A | 7/1984 | Hall |
| 2002/0196891 | A1 | 12/2002 | Rootham et al. |
| 2005/0217702 | A1 | 10/2005 | Jokela et al. |

FOREIGN PATENT DOCUMENTS

| | | | |
|---|---|---|---|
| BE | 348 055 | A | 2/1928 |
| EP | 0 410 867 | A1 | 1/1991 |
| EP | 0 458 533 | A1 | 11/1991 |
| EP | 1 162 406 | A1 | 12/2001 |
| WO | WO-96/11755 | A | 4/1996 |
| WO | WO-01/78912 | A1 | 10/2001 |

*Primary Examiner* — Robert Scruggs

(74) *Attorney, Agent, or Firm* — Muncy, Geissler, Olds & Lowe, PLLC

(57) ABSTRACT

A method of in situ scale removal from a heat exchange body suspended in a wet cooling tower. At least one air blast is generated by a generator implementing controlled expansion via a nozzle of a mass of compressed gas in a nozzle towards a zone of the body. The generator is opened at a distance from the zone, and the method repeats the operation after moving the generator under the body outside the zone.

9 Claims, 1 Drawing Sheet

20
21
22
23
24
25
26
27
28

1
2
3
3a
3b
4
5
6
7
8
9
10
11
12
13
14
15
16
17
X

METHOD AND DEVICE FOR CLEANING THE WATER TRICKLING SURFACES IN AN AIR/WATER HEAT EXCHANGER

The present invention relates to a method and a device for cleaning water-trickling surfaces in an air/water heat exchanger, such as those present for example in the lateral or horizontal packing of a cooling tower or in droplet separators.

BACKGROUND OF THE INVENTION

In cooling towers, the water of a secondary condensation circuit is cooled, for example, mainly by evaporating a fraction of the water to be cooled, which water trickles over surfaces that are provided for this purpose and that are swept by a flow of air flowing in the opposite direction to the trickling, and it is cooled to a lesser extent by the convection that occurs on the heat exchange surface within the water itself.

These surfaces are carried by a heat exchange body, commonly referred to as "packing" and constituted by sheets made of PVC in particular, which sheets are assembled to one another so as to form a cellular structure. Each cell of the structure is in the form of a tube that is about 1.5 meters (m) long, with the mean dimension of its section being of the order of a few centimeters. The walls of the cells are fine (a few tenths of a millimeter) and they are pierced by numerous orifices.

The heat exchange bodies are suspended in the cooling tower between an installation for sprinkling the water that is to be cooled and a bottom basin for recovering the cooled water, droplet separator or capture means also being located higher up in the tower in order to retain as much as possible the water droplets that are entrained by the cooling air. It is important not to exhaust this water into the atmosphere since it can carry germs that proliferate readily in the tower since it operates at a temperature that encourages such proliferation.

In use, the heat exchange body and the droplet separators become covered in a deposit of mineral salts because of the evaporation that occurs on the trickling surfaces. This deposit grows over time and, in the packing, it can reach a weight that is as much as ten times the weight of the body itself in certain installations. This deposit presents numerous drawbacks: it constitutes an obstacle to trickling and thus to the effectiveness of heat exchange, it constitutes a nest for retaining various germs that are present in the water under conditions that encourage their proliferation, it constitutes a very significant extra load on the structure supporting the heat exchange body since it is generally suspended inside the tower, . . . .

At least in theory, there are several ways of remedying that drawback. One consists in chemically treating the water for cooling so as to remove salts therefrom, thereby avoiding scaling of the heat exchange surfaces. That cannot be envisaged in the cooling towers of power stations, whether nuclear or fossil fuel.

It is also possible to dissolve the scale chemically using appropriate solutions. That technique raises difficult problems of effluent treatment and therefore has an economic impact on operating costs.

Finally, it is possible to envisage shaking the heat exchange body with any appropriate mechanical means; on being tested, that method has led to so much deterioration of the heat exchange body as to render it practically unsuitable for subsequent use.

Finally, it is possible to clean the heat exchange body mechanically after it has been disassembled, but that constitutes an operation that is extremely expensive given the large volume of the body (10 cubic meters ($m^3$) to 12,000 $m^3$ in units of about 2 $m^3$.

OBJECT OF THE INVENTION

A solution is therefore sought that enables the drawbacks of existing or potential solutions to be avoided, while nevertheless cleaning heat exchange bodies used in the cooling towers of power stations, in particular of nuclear power stations.

SUMMARY OF THE INVENTION

To this end, in a first aspect, the invention provides a method of in situ descaling a heat exchange body present in a wet cooling tower (the body being in the form of horizontal or lateral packing) or descaling a droplet separator (with scaling necessarily taking place on the fins thereof), which method consists in generating at least one air blast in large quantity and low pressure (e.g. of the order of 2 bars to 12 bars) by means of a generator serving to expand a mass of compressed gas towards a zone of the heat exchange body or towards the fins of the droplet separator in order to create a flow in said body or said separator that is substantially parallel to the surfaces of the walls constituting it, the generator being open at a distance from said zone, and the method consisting in repeating said operation after moving the generator along the heat exchange body or the separator through a step of determined size.

The gas blast generated by the generator progresses inside the cells or channels of the heat exchange body, giving rise as it passes to a kind of expansion of the inside channels of the element to be descaled and thus giving rise to local elastic deformation of the walls of said channels, the deformation being of an amplitude that is sufficient for the scale, which is hard or brittle, to become detached therefrom. During testing, it is found that a cloud of dust is formed beside the wall as though the particles of scale had been suddenly separated from the wall surface in a direction normal thereto. The flow of gas inside the element for cleaning suffers significant head loss such that the blast progresses into the inside of the body over a depth that corresponds to substantially half the total thickness of said element when it is a heat exchange body, and this is advantageous since it is specifically in this half of the body where the greatest amount of deposition takes place. The generator is presented to the face of the heat exchange body that corresponds to the outlet for the trickling water. When used with droplet separators, the length of the channels between sheets is short so the head loss to which the flow is subjected stems essentially from the baffle-shape of these channels, for ensuring that the sheets constitute obstacles that are effective in trapping the droplets that are entrained by the cooling air. The flow of gas tends to entrain at least some of the detached particles inside the channels, and it is found that they have an abrasive effect that increases the cleaning power of the method. Depending on the rate of "firing" and on the spacing between generators along the elements to be cleaned, it is possible to organize a kind of cycling for the detached particles in a plurality of successive flows.

Given that the section of such a heat exchange body can be as much as several thousand square meters, it will be understood that it is not possible to provide a blast generator capable of covering the entire area. The method of the invention thus consists in treating the bodies in question zone by zone. Thus the method consists in moving the generator continuously underneath the heat exchange body and in generating a continuous succession of blasts as it moves.

In order to improve the effectiveness of the treatment, it is possible to proceed with a stage of heating the zone in question by means of an element for blowing hot air. Since the walls of the channels constituting the elements are made of thermoplastic material (typically PVC), heating tends to make these walls more flexible and therefore to increase the difference in stiffness between the wall and the deposit. It will be understood that when the blast goes past under such conditions, the scale is separated more easily from the walls.

In a second aspect, the invention provides a device for implementing the above-described method, in which the above-mentioned generator comprises:

- a source of compressed gas;
- at least one tank having an inlet communicating with said gas source through a cock with controlled opening and closing, and an outlet communicating with the outside atmosphere via the seat of a valve member with controlled opening and closing; and
- control means for controlling the cock and the valve member to isolate the tank from the outside atmosphere while it is in communication with the compressed gas source, and for isolating it from the source when it is open to the outside atmosphere.

In an embodiment specially adapted to descaling packing (whether horizontal or vertical), in which the heat exchange surfaces define channels of small section, the outlet seat from the gas tank is extended by a nozzle in which the air flow expands progressively.

The structure of the device enables communication to be established quickly from the tank to the outside atmosphere and thus enables gas expansion to be obtained that leads to a blast being created that is powerful but at low pressure (2 bars to 12 bars) and that propagates from the outlet of the tank, or of the nozzle when a nozzle is provided, towards the face of the element next to which it opens out. It is found that the device should not be located immediately under the body, but should be at a distance therefrom so that the material constituting the channels is not damaged by a gas pressure that is too high and too localized. This distance needs to be of the order of a few tens of centimeters (e.g. 15 cm to 50 cm).

It has also been observed that with a device having a nozzle, it is advantageous for the free end of the nozzle to be situated inside a cylindrical sleeve that is spaced apart radially from said end. The gas leaving the nozzle generates suction in the gap between the wall of the nozzle and the sleeve, thereby creating a kind of tubular fluid sheath that contains the outgoing stream of gas in a direction that lies substantially on the axis of the channels. This sheath prevents the outgoing gas stream from diverging and reaching the cells at an angle of incidence that causes the kinetic energy of the stream to apply pressure to said walls and deform them to breaking point. This is particularly desirable with packing.

In a particular embodiment of this device, the valve member is mounted to slide on a stationary rod inside the tank and co-operates with said rod to define a variable-volume chamber suitable for being connected selectively to the compressed gas source and to the atmosphere for the purpose respectively of closing and opening the outlet of the tank. In addition, the rod is hollow; it is in permanent communication with the source of gas under pressure and it possesses openings putting its inside volume into communication with the tank, while the valve member is shaped as a jacket with a wall that is suitable for covering said openings when the valve member is spaced apart from its seat so that, in this position, the tank is isolated from the gas source. These means make it easy to obtain rapid opening of the outlet from the tank via a flow section that becomes large very quickly. These means also enable the movement of the various moving parts to be synchronized mechanically in simple manner so as to feed gas and exhaust gas at relatively high frequencies, as is necessary to ensure that the treatment of a heat exchange body, for example, can be performed in a length of time that is compatible with the industrial operating requirements for a cooling tower.

Advantageously, the device of the invention includes a source for blowing hot air towards the element to be treated. This may be constituted merely by a blower serving to heat the plastics material forming the body to be descaled prior to the "campaign" of shots to which it is subjected on a continuous basis, for example.

Finally, the device of the invention may be provided with a hopper for collecting the particles of scale that are detached by the treatment and that fall under the effect of gravity, in particular when operating under horizontal packing. Other collector means, e.g. suction means, could be implemented with the device of the invention.

Other characteristics and advantages of the invention appear from the description given below of an embodiment.

BRIEF DESCRIPTION OF THE DRAWING

Reference is made to the accompanying drawing, in which.

DETAILED DESCRIPTION OF THE INVENTION

Figures 1, 2:
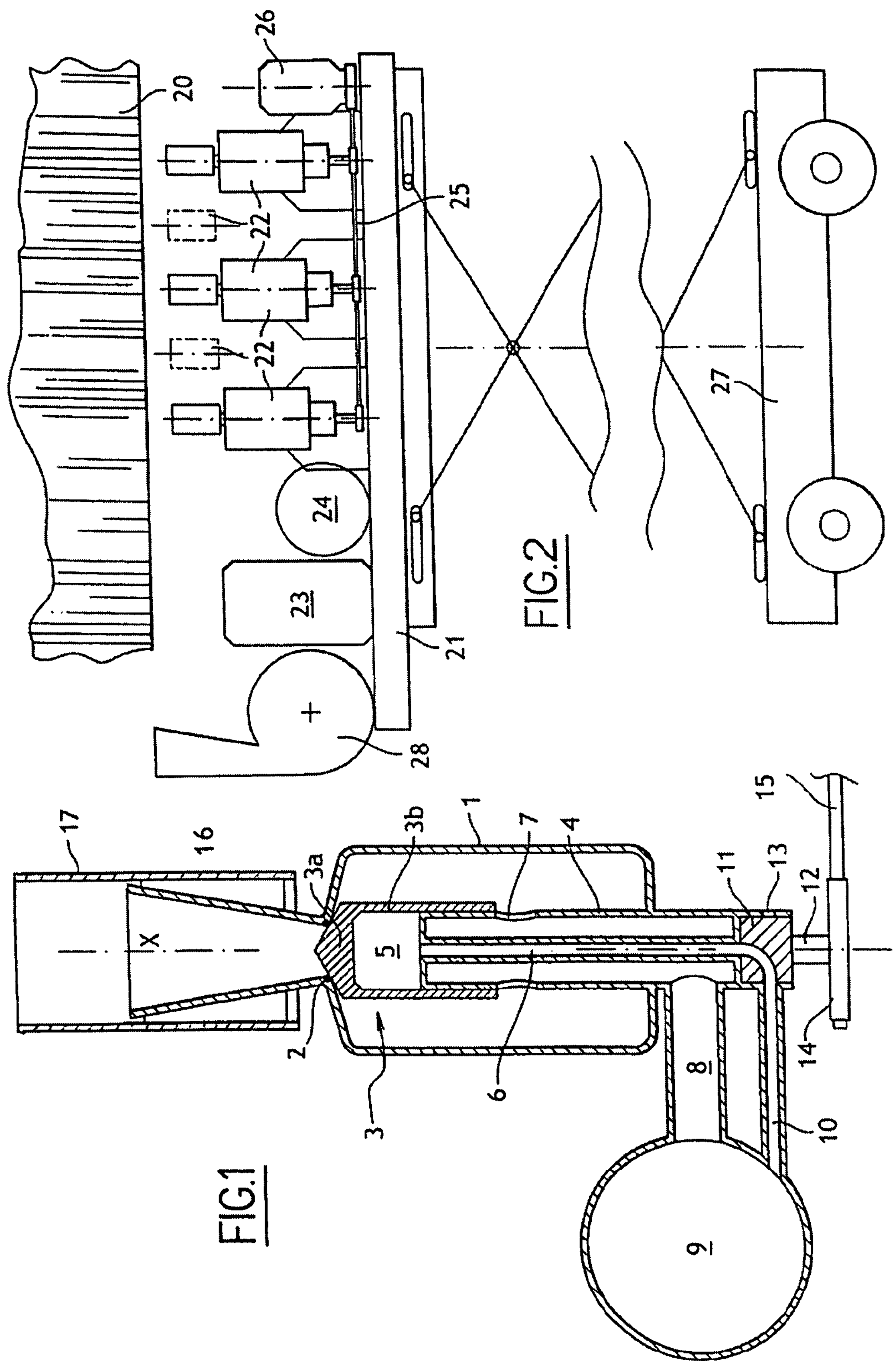
FIG. 1 is a schematic diagram of a shockwave generator implemented in the invention.
FIG. 2 shows the implementation of the method in accordance with the invention in treating horizontal packing.

FIG. 1 shows a tank 1 having an outlet opening shaped to constitute a valve seat 2 suitable for being closed or opened by a valve member 3. The tank is generally cylindrical in shape with a longitudinal axis X on which the seat is centered. On this axis the tank includes a stationary internal rod 4 made in the form of a tube that is closed at its end inside the tank and that passes through the wall of the tank opposite from the seat 2. The valve member 3 is constituted by a tubular jacket **3*b* and a head 3*a*** at the top of the jacket, the head being of a profile that is adapted to close the seat in leaktight manner while presenting an annular thrust surface around the seat that can be acted on by the pressure that exists inside the tank.

The valve member 3 is slidably mounted on the rod 4 and co-operates with the closed end thereof to define a variable-volume chamber 5 into which a duct 6 opens out, the duct 6 being inside the rod 4 and being isolated from the inside volume thereof.

The side wall of the rod 4 is provided with a plurality of openings 7 at a level such that they are completely uncovered by the jacket **3*b* when the valve member is pressed against its seat, while being covered by the jacket when the valve member 3 is moved away from the seat 2**.

Outside the tank 1, the inside volume of the rod 4 is connected via a duct 8 to a pressure source 9 that may be a manifold fed by a compressor or one or more cylinders of compressed gas (air). The duct 6 is connected to the same compressed gas source 9 via a duct 10 and a rotary plug cock 11 with a drive shaft that is referenced 12 in the figure. In the position shown, the cock establishes communication between the source 9 and the duct 6, and thus the chamber 5. In the opposite position, after the plug of the cock 11 has been turned through half a turn, it isolates the chamber 5 from the source of pressure and puts it into communication with the atmosphere via an exhaust orifice 13 opposite from the duct 10. The plug of the cock is coupled by its drive shaft 12 to a gearwheel 14 forming part of a rotary drive transmission system for transmitting drive from a motor that is not shown in the figure and that includes, for example, a cog belt 15 for driving the gearwheel 14. In an example that is not shown, the rotary plug cock could be replaced by any suitable solenoid valve.

Finally, there can be seen in this figure a nozzle 16 that diverges away from the outlet orifice of the tank 1. Outside the nozzle, the device includes a cylindrical sleeve 17 that surrounds and extends the outlet from the nozzle into the atmosphere.

The above-described device operates as follows.

It is assumed that the first state of the device is that shown in FIG. 1. In this state, the chamber 5 is full of gas under pressure, thereby tending to press the valve member 3 against the seat 2 surrounding the outlet opening from the tank 1. In this position, the skirt 3*b* of the valve member lies above the openings 7, and the inside chamber of the tank 1 is in communication with the source 9 of gas under pressure.

The plug 11 is turned, e.g. being driven to rotate continuously. During the first portion of this rotation, the chamber 5 is isolated from the source 9, and then the channel through the plug reaches the exhaust orifice 13. The chamber 5 is then vented and the pressure that exists inside the tank 1 bearing against the annular surface of the valve member around the seat 2 is no longer opposed by the pressure that exists inside the chamber 5. The valve member is thus moved away from the seat 2. The volume inside the tank 1 is thus connected to atmospheric pressure via the outlet orifice surrounded by the seat 2, while the jacket 3*b* of the valve member 3 overlies the orifices. The expansion of the gas in the nozzle 16 that extends the outlet orifice causes a blast to be formed that propagates towards the outlet of the nozzle 16 along the axis X of the device.

Inside the nozzle, the flow of gas leads to a drop in pressure, and at the outlet from the nozzle 16 the flow is channeled by the presence of the sleeve 17, thereby establishing therein, by the Venturi effect, a peripheral tubular flow that constitutes means for confining the divergence of the stream leaving the nozzle. The flow of gas outside the nozzle is thus maintained substantially parallel to the axis X of the device.

As it continues to rotate, the plug returns the device to the state shown. At this moment, the chamber 5 is no longer connected to the atmosphere, but is once more in communication with the gas source 9. The valve member 3 is then pressed once more against the seat 2, thereby serving firstly to isolate the inside chamber of the tank 1 from the atmosphere, and secondly, once the openings 7 have been uncovered, connecting the chamber to the source of gas under pressure. The cycle thus begins again so long as the gearwheel 14 is driven in rotation.

FIG. 2 is a diagram showing a battery of devices of the kind described above being implemented in an operation for cleaning a heat exchange body 20 suspended in a cooling tower, e.g. in a power station. A frame 21 carries a plurality of blast generators 22 with their nozzles pointing upwards under the heat exchange body 20. The distance H between the outlets from the nozzles and the bottom end of the suspended body is of the order of 15 cm to 30 cm. The frame also carries a source of gas (air) under pressure, constituted in this example by a compressor 23 and a manifold 24. Each generator 22 possesses a rotary plug valve coupled to a transmission system 25 driven by a motor 26. This transmission system is constituted by a belt driving all of the controlling gearwheels of the valve synchronously. By having each plug angularly offset relative to all of the others, the generators are organized to fire their "shots" successively over time; for example, if the frame carries six generators, an angular offset of 60° between plugs enables six successive shots to be obtained during the time taken by a plug to perform one revolution. If solenoid valves are used, then they are triggered to execute the sequence by a controller.

The frame 21 is shown as being mounted on an elevator platform 27 (or a crane) that may be self-propelled and that serves to adjust the distance H between the heat exchange body 20 and the nozzles. The travel speed of the platform under the heat exchange body is adjustable, e.g. around a few centimeters per second.

In operation, the release of gas under pressure on each opening of a valve member creates a blast that propagates into the channels formed through the heat exchange body by fine sheets of PVC, deforming the elements of the heat exchange body and breaking up the deposit on the surfaces of said elements. The scale that has become deposited uniformly on the sheets of PVC is hard and brittle, while its support as constituted by the fine sheets of PVC is very flexible, so the scale breaks into pieces when its support is deformed under the effect of the shockwave. Once the scale has cracked or broken up, it is more inclined to separate from its support.

In addition, the stream of air simultaneously sweeps intensely over all of the volatile elements contained in the channels as it passes therethrough. The pieces of scale that are initially loosened from the sheets of PVC by the shockwave are then swept along by the stream of air and they contribute to cleaning the channels by abrasion.

The device shown in FIG. 2 includes a device for heating the heat exchange body 20, which device is represented diagrammatically in the form of a hot air blower 28. Provision is also made to fit the top assembly with a detached scale collector, e.g. in the form of a hopper surrounding the frame 21 and not shown in order to ensure the drawing is clear. The bottom outlet from the hopper may be connected to a suction source.

The method of the invention and the device used for implementing it in a modified embodiment different from that shown in the figures can be used for treating other scaled elements such as lateral packing in certain forms of air-cooled towers, or droplet separators that are also deployed in such towers to minimize the quantity of droplets that are entrained into the atmosphere by the air leaving the tower. Such separators are not heat exchange bodies and rather they form physical barriers (baffles) for the droplets contained in the air stream, which baffles are necessarily subjected to scale formation that is less than that on the heat exchange bodies but still sufficient for it to become necessary in the long run to treat them in order to restore their initial performance.

The invention claimed is:

1. A device comprising a generator for in situ descaling an element body covered in a deposit, and present in a wet cooling tower, by generating at least one air blast of large quantity and low pressure by means of the generator causing a mass of compressed air to expand towards a zone of the element so as to create a flow in said element that is substantially parallel to the surfaces of walls constituting it, the generator being open at a distance (H) from said zone, and said operation being repeated after moving the generator along the element, wherein the generator comprises:

a source of compressed gas;

at least one tank having an inlet communicating with said gas source through a cock with controlled opening and closing, and an outlet communicating with the outside atmosphere via the seat of a valve member with controlled opening and closing; and control means for controlling the cock and the valve member to isolate the tank from the outside atmosphere while it is in communication with the compressed gas source, and for isolating it from the source when it is open to the outside atmosphere;

wherein the valve member is mounted to slide on a stationary rod inside the tank and co-operates with said rod to define a variable-volume chamber suitable for being connected selectively to the compressed gas source and to the atmosphere for the purpose respectively of closing and opening the outlet of the tank.

2. The device according to claim 1, open to the outside atmosphere via a nozzle for guiding and expanding the stream of air beyond the seat of said valve member.

3. The device according to claim 1, wherein the free end of the nozzle is situated inside a cylindrical sleeve radially spaced apart from said end.

4. The device according to claim 1, wherein the rod is hollow, communicating continuously with the source of gas under pressure and possessing communication openings between its inside volume and the tank, while the valve member is shaped as a jacket having a wall suitable for covering said opening when the valve member is spaced apart from its seat in such a manner that, in this position, it isolates the tank from the gas source.

5. The device according to claim 4, including a plurality of tanks mounted on a common frame supporting a single drive device for all of the rotary cocks used, each plug of a cock being angularly offset from each of the other plugs so that a single drive for all of the plugs leads to successive shock-waves being generated.

6. The device according to claim 1, wherein selective communication with the variable-volume chamber includes a rotary cock of axis coinciding with the axis of the rod.

7. The device according to claim 6, wherein the rotary cock is replaced by a solenoid valve.

8. The device according to claim 1, including a source for blowing hot air towards the element that is to be treated.

9. The device according to claim 1, wherein when the element is a horizontal heat exchange body, it includes a hopper for recovering the scale detached from the heat exchange body.

* * * * *